US007552969B2

(12) United States Patent
Maciejczyk

(10) Patent No.: US 7,552,969 B2
(45) Date of Patent: Jun. 30, 2009

(54) CHILD SAFETY SEAT, SHELL AND HARNESS

(75) Inventor: Wieslaw Maciejczyk, Victoria (AU)

(73) Assignee: Britax Childcare Pty Ltd, Victoria (AU)

( * ) Notice: Subject to any disclaimer, the term of this patent is extended or adjusted under 35 U.S.C. 154(b) by 0 days.

(21) Appl. No.: 11/570,122

(22) PCT Filed: Jun. 9, 2005

(86) PCT No.: PCT/AU2005/000820

§ 371 (c)(1),
(2), (4) Date: Dec. 6, 2006

(87) PCT Pub. No.: WO2005/120910

PCT Pub. Date: Dec. 22, 2005

(65) Prior Publication Data

US 2007/0176477 A1   Aug. 2, 2007

(30) Foreign Application Priority Data

Jun. 9, 2004   (AU) .............................. 2004903092

(51) Int. Cl.
*A47C 1/08* (2006.01)
(52) U.S. Cl. .................... 297/250.1; 297/254; 297/484; 297/485; 280/801.1
(58) Field of Classification Search ............... 297/250.1, 297/254, 484, 485
See application file for complete search history.

(56) References Cited

U.S. PATENT DOCUMENTS

| 2,627,903 | A | * | 2/1953 | Stevenson | 297/254 |
| 3,428,029 | A | * | 2/1969 | Klickstein et al. | 297/484 |
| 3,834,758 | A | * | 9/1974 | Soule | 297/484 |
| 3,954,280 | A | * | 5/1976 | Roberts et al. | 280/801.2 |
| 4,099,770 | A | * | 7/1978 | Elsholz et al. | 297/216.11 |
| 5,676,398 | A | * | 10/1997 | Nurtsch | 280/806 |
| 5,833,309 | A | * | 11/1998 | Schmitz | 297/180.11 |
| 5,915,789 | A | * | 6/1999 | Ponce De Leon, III | 297/484 |
| 6,006,967 | A | | 12/1999 | Tsao | |
| 6,109,698 | A | * | 8/2000 | Perez | 297/484 |
| 6,189,970 | B1 | * | 2/2001 | Rosko | 297/250.1 |
| 6,364,417 | B1 | * | 4/2002 | Silverman | 297/464 |

(Continued)

FOREIGN PATENT DOCUMENTS

AU   WO 82/01520 A1   5/1982

(Continued)

*Primary Examiner*—David Dunn
*Assistant Examiner*—Jeff Tang
(74) *Attorney, Agent, or Firm*—Adams Intellectual Property Law, P.A.

(57) ABSTRACT

A child safety seat arrangement is disclosed wherein the child is secured to the safety seat by a harness. The harness is then secured with respect to the vehicle by a mounting arrangement that is independent of any seat shell. Preferably, there is also a seat shell that is itself secured with respect to the vehicle.

Also disclosed is a child safety seat arrangement having a seat shell with apertures through which a harness can be passed. The harness preferably includes a main harness strap which is looped behind the seat shell, through a pair of apertures therein, to provide two shoulder straps to extend over a child's shoulders. The disclosure includes multiple pairs of apertures to allow for adjustment of the height of the shoulder straps.

10 Claims, 8 Drawing Sheets

U.S. PATENT DOCUMENTS

| | | | |
|---|---|---|---|
| 6,402,251 B1 * | 6/2002 | Stoll | 297/485 |
| 6,457,774 B2 | 10/2002 | Baloga | |
| 6,543,846 B2 * | 4/2003 | Cone | 297/250.1 |
| 6,543,847 B2 | 4/2003 | Balensiefer | |
| 6,616,242 B1 * | 9/2003 | Stoll | 297/485 |
| 7,021,719 B2 * | 4/2006 | Stoll | 297/485 |
| 7,140,692 B2 * | 11/2006 | Stoll | 297/485 |
| 7,278,684 B2 * | 10/2007 | Boyle | 297/253 |
| 7,488,038 B2 * | 2/2009 | Boyle et al. | 297/255 |
| 2002/0000744 A1 * | 1/2002 | Maciejczyk | 297/254 |
| 2003/0085608 A1 * | 5/2003 | Girardin | 297/484 |
| 2007/0001495 A1 * | 1/2007 | Boyle et al. | 297/253 |
| 2007/0102991 A1 * | 5/2007 | DeLellis et al. | 297/484 |

FOREIGN PATENT DOCUMENTS

| | | |
|---|---|---|
| AU | WO 01/05313 A1 | 1/2001 |
| AU | WO 01/34428 A1 | 5/2001 |
| AU | WO 2005/120910 A1 | 12/2005 |
| DE | 3342594 A1 | 6/1985 |
| EP | 1285810 A1 | 2/2003 |

* cited by examiner

CHILD SAFETY SEAT, SHELL AND HARNESS

FIELD OF THE INVENTION

The present invention relates to child safety seats.

BACKGROUND OF THE INVENTION

In current child safety seats, the child is restrained in the safety seat by a child harness, which is connected at the top and bottom to the shell of the safety seat. The seat shell itself is connected to the vehicle by means of the vehicle seat belt, for example a lap/sash belt. In addition, it is usual to have a tether strap connected to the shell and to a vehicle anchorage point. Typically, an upper tether strap is connected to a vehicle anchorage point on a shelf behind the rear seat using a latching hook connector.

However, the shell of a child safety seat can have imperfections and weak points, which may give way in the event of a collision, thereby compromising the safety of the infant. Furthermore, children of different sizes are not always sufficiently restrained in the safety seat.

It is an object of the present invention to reduce or eliminate some or all of the disadvantages of conventional child safety seat arrangements.

SUMMARY OF THE INVENTION

In a first aspect, the present invention accordingly provides a child safety seat for a motor vehicle including:
  a seat for seating a child therein comprising a seat portion and a backrest portion;
  a tether strap, secured with respect to a head end of the backrest portion and adapted to be secured t an anchorage point on the motor vehicle; and
  a harness to secure the child with respect t the safety seat comprising a pair of shoulder straps secured at their lower ends and wherein said harness extends behind the backrest portion to be secured with respect to said anchorage point.

Current arrangements rely on the mechanical integrity of the seat shell to secure the child with respect to the vehicle. In the event of a collision, the collision loads are applied to the seat shell. Therefore, the safety of the infant is dependent on the integrity of the seat shell. However, this disadvantage is alleviated with the present invention, wherein the upper end of the harness at least is secured independently of the seat shell.

Usually, both an upper part and a lower part of the harness will be secured to the vehicle. The upper part of the harness will generally be secured to an upper vehicle anchorage point.

The lower part of the harness may be secured with respect to the vehicle by a vehicle seat belt, which can be located across the seat shell and the waist of the infant. The first mounting arrangement may therefore include one or more loops through which the vehicle seat belt passes, thereby allowing the lower part of the harness to be secured with respect to the vehicle.

Both the first and second mounting arrangements may be connected to one or more vehicle anchorage points. Therefore, they may each include a connecting component, such as a latching hook connector.

Although the first and second mounting arrangements may be independent of each other, they may also include shared components. Indeed, as vehicle anchorage points often provide only one aperture or fitting to receive a latching hook connector, it may be preferable for the first and second mounting arrangements to include shared components.

Accordingly, in some embodiments, one of the mounting arrangements may include a connecting component to connect to the vehicle anchorage, which is further provided with an aperture to receive a connecting component which is part of the other mounting arrangement. The connecting component which is connected to the vehicle anchorage could then be shared by both the first and second mounting arrangements. There are, of course, other ways in which a component may be shared.

The harness includes two shoulder straps to extend over the child's shoulders, along their chest. These shoulder straps may be provided by looping a harness strap behind the seat shell and through apertures in the seat shell. Further, the shoulder straps preferably each include a loop towards their bottom to receive a vehicle seat belt.

The harness is preferably adjustable to suit children of different sizes. The length of the harness may be adjusted, typically through an adjustable buckle, to tighten or loosen the harness. This buckle may be covered in use by padding. The harness may also, in some embodiments, be adjusted by passing it through higher or lower apertures in the seat shell.

The harness preferably also includes a cross strap connecting the two shoulder straps at a point below the child's shoulders. The cross strap may be strongly fixed to one shoulder strap—for instance by stitching—but preferably is removably attached to the other shoulder strap—for instance by a loop through which the shoulder strap can be passed. This arrangement is of particular advantage where the shoulder straps are provided by looping a main harness strap behind the seat shell, through apertures therein, because it allows for simple connection of the shoulder straps after they have passed through the apertures (during either assembly or adjustment).

A crutch strap attached to the seat shell may be secured to either the child harness or the vehicle seat belt to keep the vehicle seat belt as low as possible.

The first mounting arrangement may include extension straps which are ideally adjustable in length by means of adjustable buckles. This allows adjustment of the distance between the harness and the point or points at which it is secured to the vehicle.

In a second aspect, the present invention provides a child safety seat arrangement including:
  a seat shell to seat a child, having at least one aperture therein; and
  a harness to hold the child in the seat shell, the harness including two shoulder straps to pass over the child's shoulders,
  wherein the harness passes through at least one aperture in the seat shell.

This allows the shoulder straps to locate closer to the child's shoulders than in current child safety seat arrangements. This allows the child to be more securely retained in the safety seat.

Preferably, there are one or more pairs of apertures through which the shoulder straps can be passed, and the shoulder straps of the harness are provided by looping a main harness strap through a pair of apertures and behind the seat shell.

Preferably, the shoulder straps each include a loop to receive a vehicle seat belt.

Again, the harness may include a cross strap connecting the two shoulder straps at a point below the child's shoulders, which may be removably attached to one of the shoulder straps. This may be accomplished by a loop of the cross strap that can be slipped on or off the bottom of the shoulder strap.

In a third aspect of the present invention, there is provided a seat shell for a child safety seat arrangement having apertures through which one or more parts of a harness can be passed. Preferably, there are two or more pairs of apertures, thereby allowing the height of the harness to be adjusted.

In a fourth aspect of the present invention, there is provided a harness for a child safety seat arrangement, including a main shoulder strap which can be looped behind a seat shell to provide two shoulder straps to extend over a child's shoulders.

BRIEF DESCRIPTION OF THE DRAWINGS

An illustrative embodiment of the present invention will be discussed with reference to the accompanying drawings wherein.

DESCRIPTION OF PREFERRED EMBODIMENT

Figure 1:
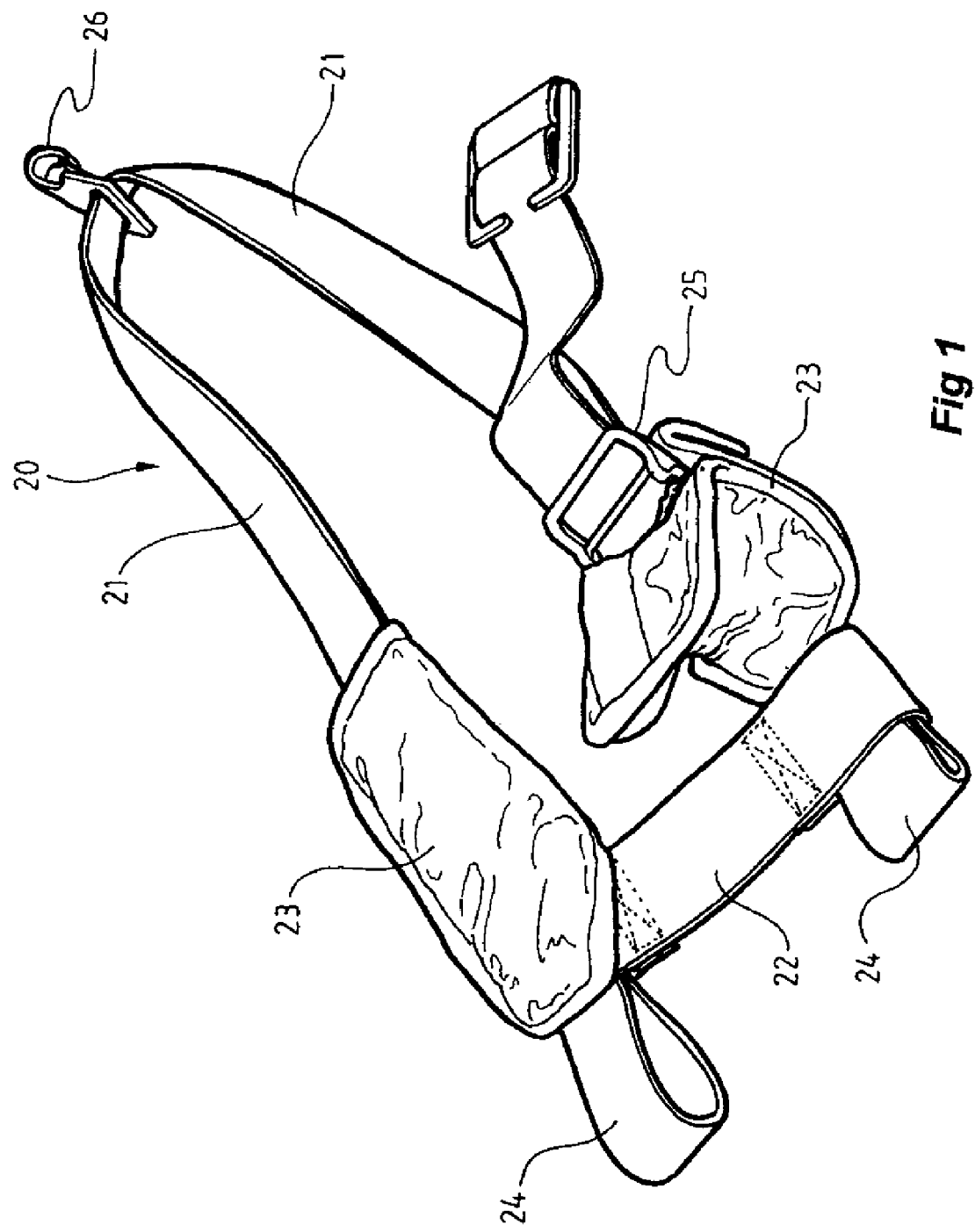
FIG. 1 is a view of a harness for use according to the present invention.

FIG. 1 shows a child harness 20 consisting of two shoulder straps 21 and a cross strap 22. The shoulder straps are provided with padding 23, and the lower end of each shoulder strap 21 is provided with a loop 24 to receive a vehicle seat belt. The child harness 20 is adjustable in length by means of an adjustable buckle 25, which is covered during use within the padding 24 on one of the shoulder straps 21. There is also a latching hook connector 26 on the upper end of the child harness 20.

Figure 2:
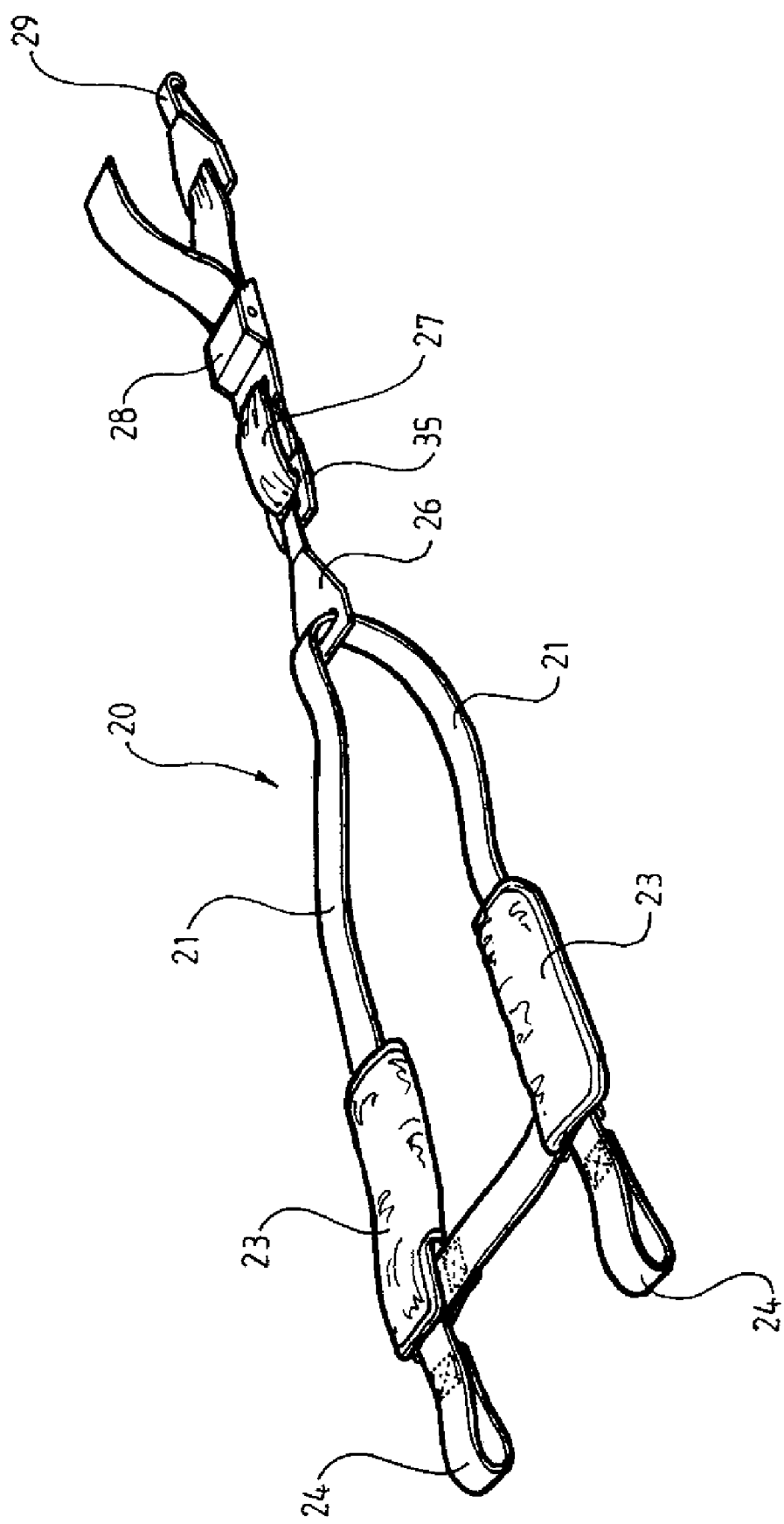
FIG. 2 is a view a harness for use according to another embodiment of the present invention.

In FIG. 2, the same harness is shown with an additional extension strap 27, which in this instance is adjustable by means of another adjustable buckle 28. The extension strap 27 has a connection buckle 35 that enables attachment to the latching hook connector 26. A second latching hook connector 29 is attached to the other end of the extension strap 27.

Figure 3:
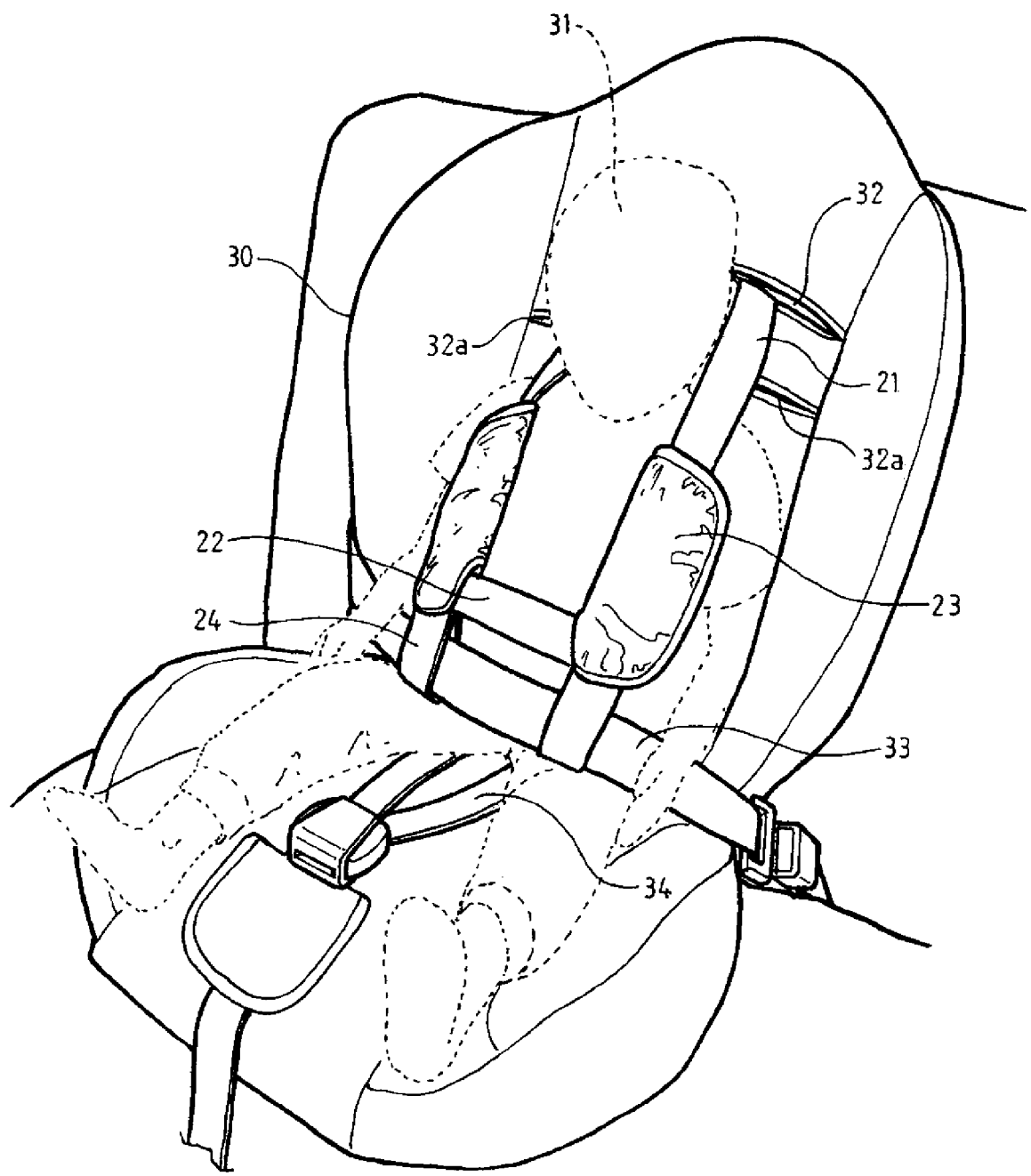
FIG. 3 is a view of a child safety seat arrangement according to a preferred embodiment of the present invention, in operation.

FIG. 3 shows a front view of child safety seat arrangement according to the present invention in operation. A child harness 20 is shown holding the child 31 in a seat shell 30, by means of shoulder straps 21. The harness 20 is passed through a pair of apertures 32 in the seat back of the seat shell 30. The shoulder straps 21 then extend over the child's shoulders and chest. The vehicle lap belt 33 is passed through the loops 24 at the lower ends of shoulder straps 21. The lap belt 33 can then optionally be connected to the seat shell 30 by means of crutch strap 34, which helps keep the lap belt 33 as low as possible.

Figure 4:
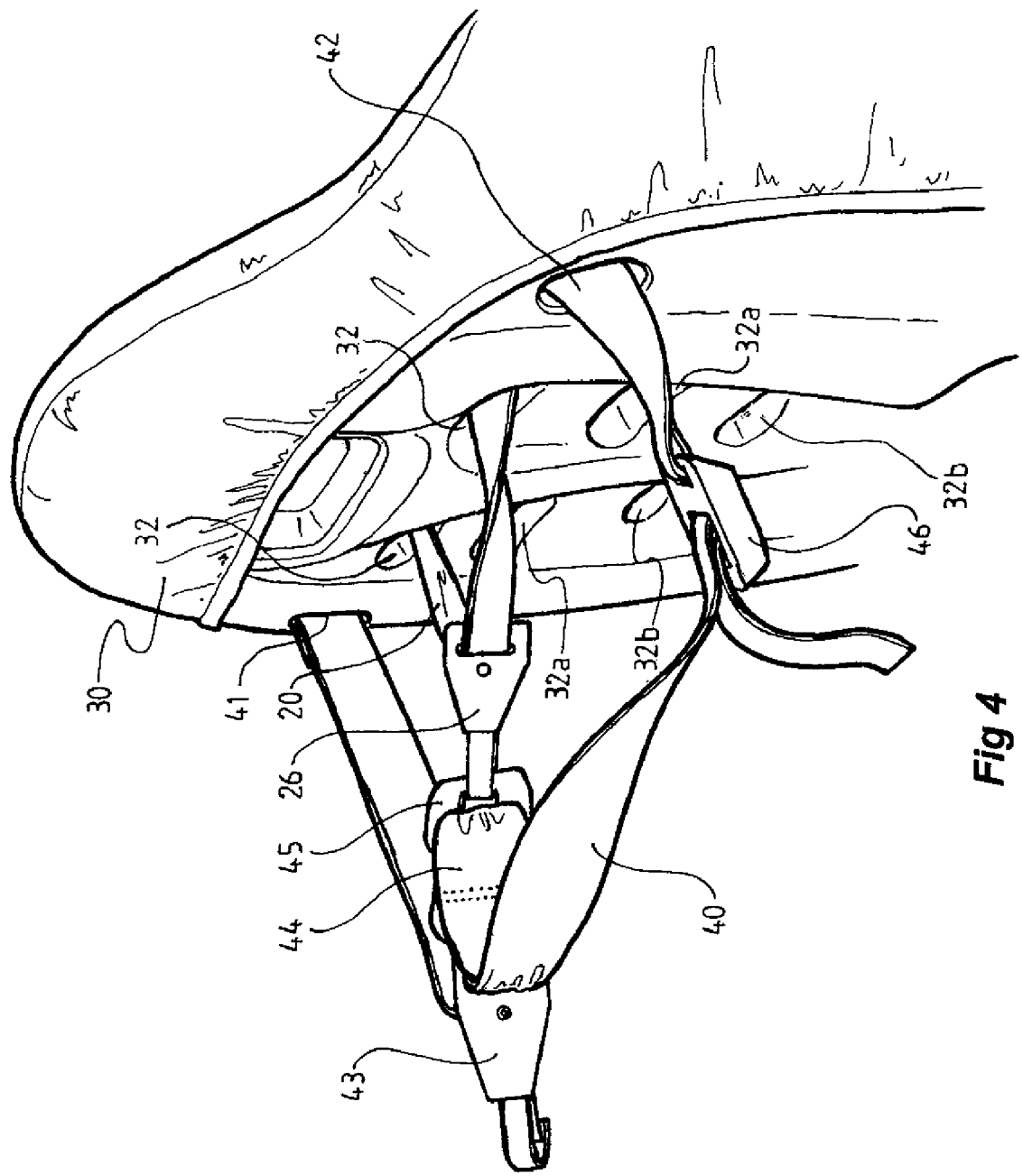
FIG. 4 is a rear view of a child safety seat arrangement according to a preferred embodiment of the present invention.
Figure 5:
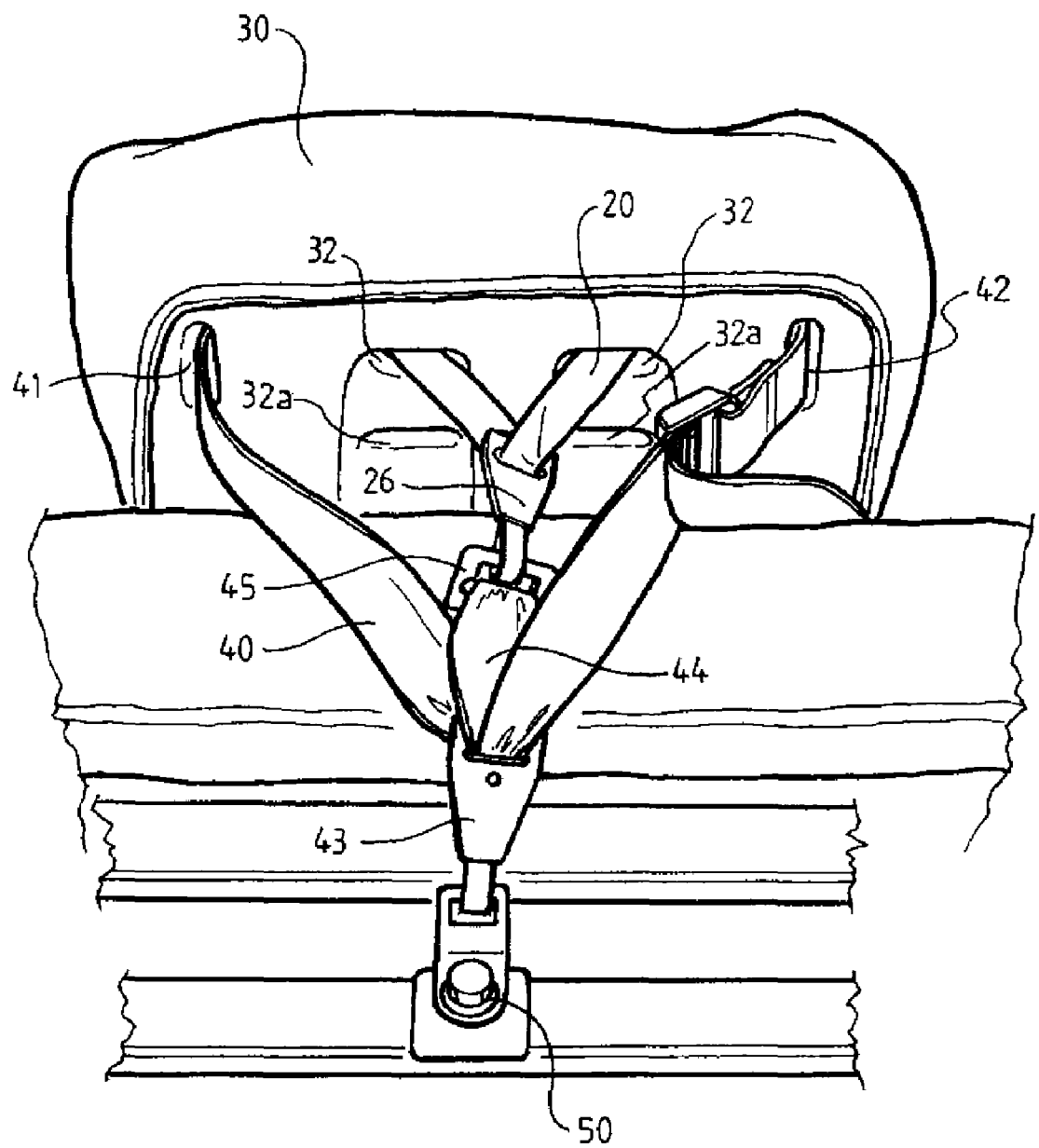
FIG. 5 is a top rear view of a child safety seat arrangement according to a preferred embodiment of the present invention, attached to a vehicle anchorage point.

In FIGS. 4 and 5, there can be seen the mounting arrangements for securing the harness 20 and the seat shell 30 with respect to the vehicle. A tether strap 40 is connected at one end to the seat shell 30 at connection points 41 and 42, and at the other to a vehicle anchorage point 50 through latching hook connector 43. The length of the tether strap 40 can be adjusted through the adjustable buckle 46, to allow the mounting arrangement to suit different vehicles.

As is also shown clearly in FIGS. 3 to 5, the seat shell includes multiple pairs of apertures 32, 32a and 32b. The harness 20 can be looped through any of these pairs to adjust the height of the shoulder straps 21. It is preferable to have the shoulder straps located close to the child's shoulders, as this gives greater retention of the child in the safety seat. Although multiple pairs of apertures are shown in this preferred embodiment, it would also be possible, to have the harness passed through a single aperture in the seat shell. For instance, the shoulder straps could be joined before they are passed through a single aperture.

The harness 20 is secured with respect to the vehicle through latching hook connector 26, connection strap 44, buckle 45 and latching hook connector 43. In this instance, it will be noted that latching hook connector 43 is common to both the mounting arrangement for the harness 20, and to the mounting arrangement for the seat shell 30. However, the harness 20 is still secured to the vehicle through an arrangement that does not include the seat shell 30.

Of course, the mounting arrangements for securing the harness 20 and seat shell 30 with respect to the vehicle can take other forms. FIGS. 6-11 show a variety of mounting arrangements for the harness 20 and tether system 30.

Figure 6:
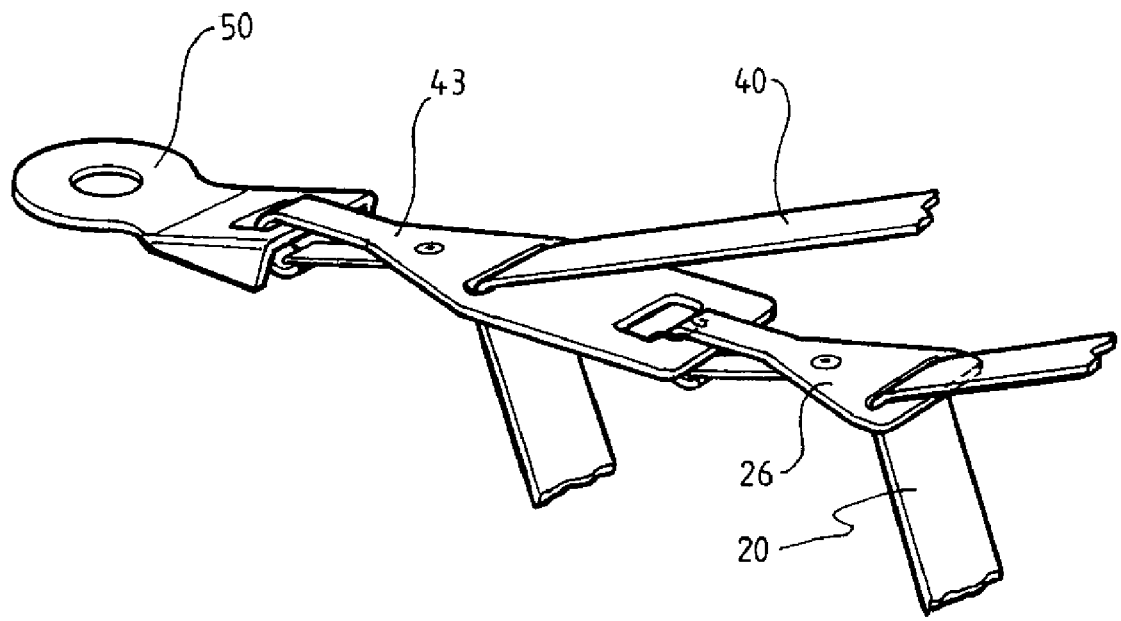
FIGS. 6 to 11 show detailed views of mounting arrangements as used in various embodiments of the present invention.
Figure 7:
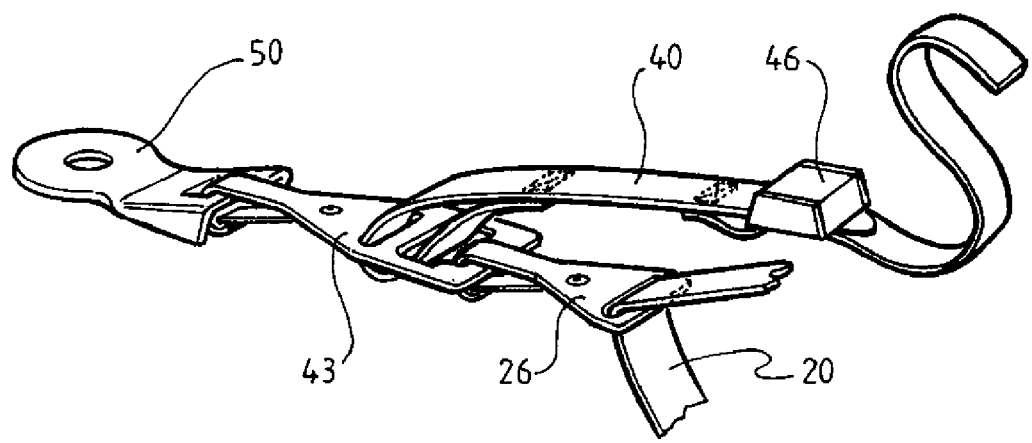

The arrangement in FIG. 6 does not require the connection strap 44, and the harness 20 is secured to the vehicle anchorage point 50 simply by means of the two latching hook connectors 26 and 43. As will be noted, the latching hook connector 43 as shown in FIGS. 6 and 7 includes two apertures to receive both the tether strap 40 and the hook connector 26. Typically, latching hook connectors only include one aperture to receive the strap that they are intended to secure. However, in the present invention, a single latching hook connector may be common to both of the mounting arrangements for the harness and for the seat shell. Therefore, it may need to be attached to one or more components from both mounting arrangements. The additional aperture in latching hooked connector 43 (as shown in FIG. 6) increases the flexibility in attaching multiple other components to a single latching hooked connector.

Figure 8:
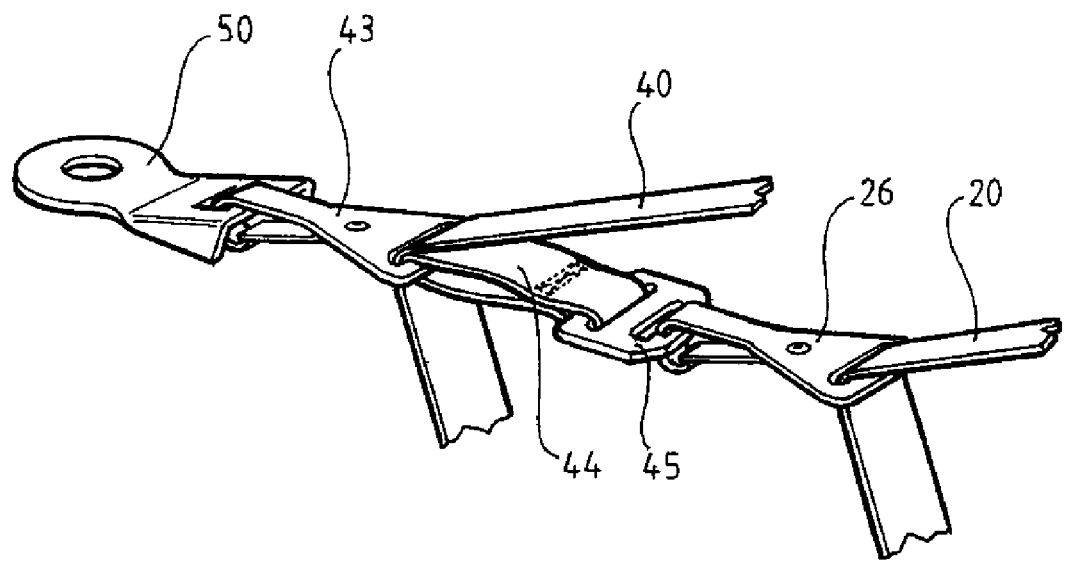

FIG. 8 shows in more detail the mounting arrangement shown in FIGS. 4 and 5. A tether strap 40 is connected to a vehicle anchorage point 50 through latching hook connector 43. The harness 20 is secured with respect to the vehicle through latching hook connector 26, connection strap 44, buckle 45 and latching hook connector 43. In this instance, it will be noted that latching hook connector 43 is common to both the mounting arrangement for the harness 20, and to the mounting arrangement for the seat shell 30.

Figure 9:
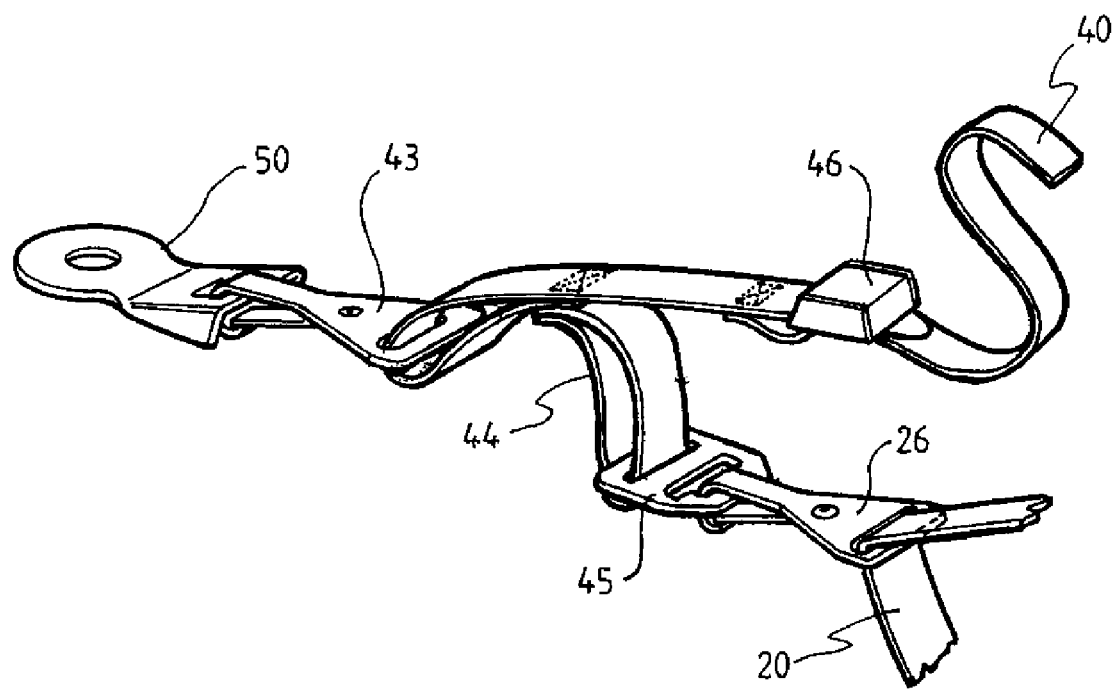

FIGS. 7 and 9 also show other options for securing a tether strap 40 to the latching hook connector 43, and these alternatives are also envisaged under the present invention.

Figure 10:
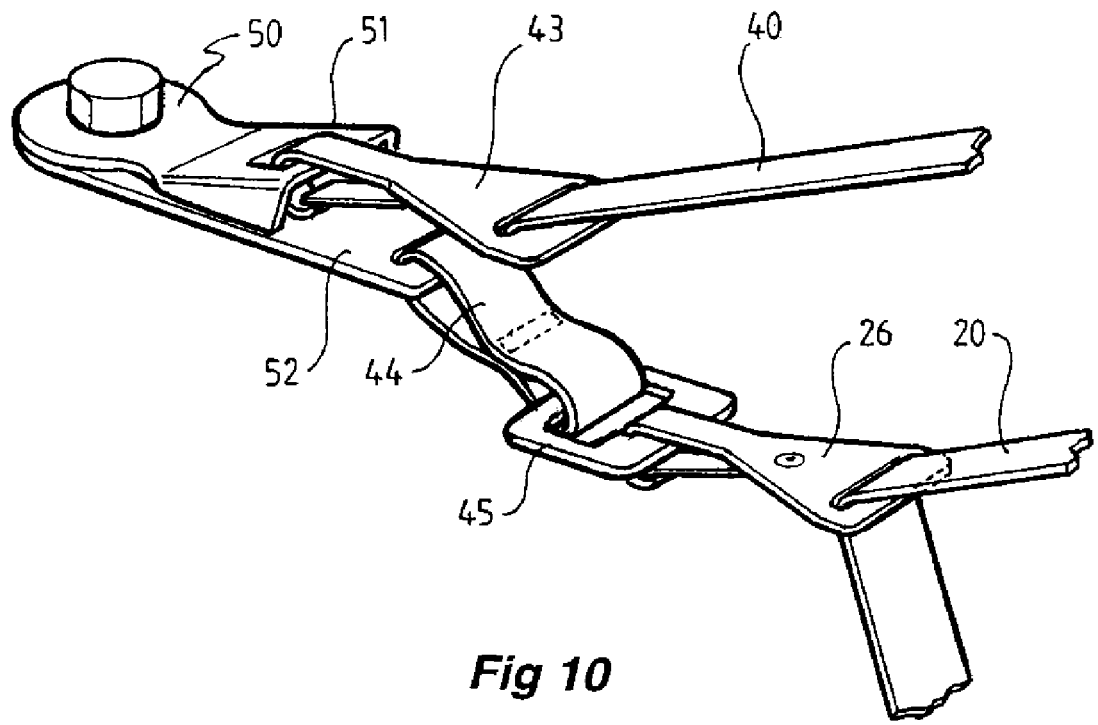
Figure 11:
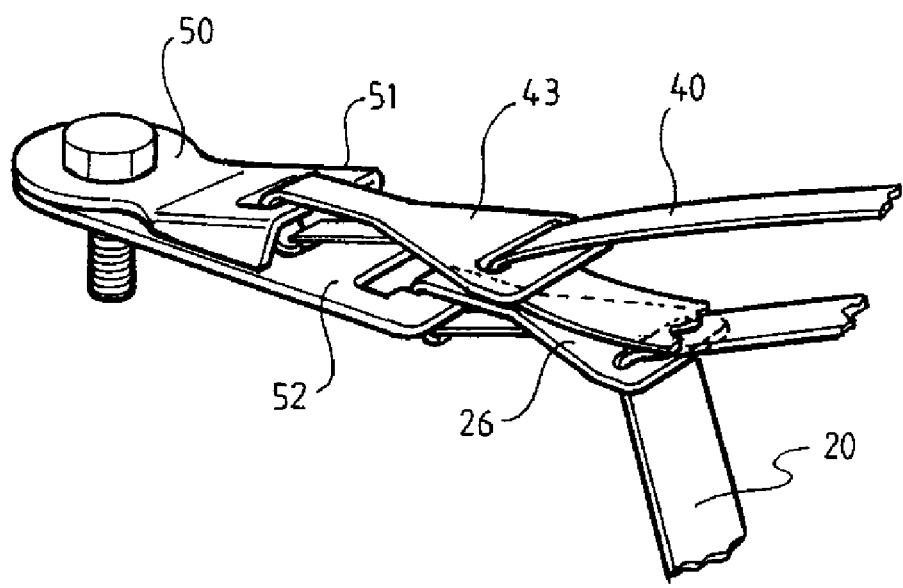

FIGS. 10 and 11 show arrangements which can be used when there are two vehicle anchorage fittings 51 52 provided. In this instance, the mounting arrangements for the seat shell 30 and the harness 20 are independent. In both FIGS. 10 and 11, the seat shell (through tether strap 40) is secured to the vehicle by connecting the latching hook connector 43 to one of the vehicle anchorage fittings 51. However, the harness 20 is connected to a separate vehicle anchorage fitting 52. FIG. 11 shows a connection directly by means of latching hook connector 26, whereas in FIG. 10, the connection strap 44 and buckle 45 are also used to secure the child harness 20 to vehicle anchor fitting 52.

Although a number of embodiments of the present invention have been described in the foregoing detailed description, it will be understood that the invention is not limited to the embodiments disclosed, but is capable of numerous rearrangements, modifications and substitutions without departing from the scope of the invention. Modifications and variations such as would be apparent to a skilled addressee are deemed within the scope of the present invention.

The invention claimed is:

1. A tether strap assembly for a vehicle child safety seat having a seat bottom and an attached seat back, comprising:
    (a) a strap having first and second seat connectors for attachment to opposing lateral sides of the seat back of the child safety seat and an anchor connector assembly positioned on the strap intermediate the first and second seat connectors and having an anchor connector thereon for attachment to a complementary anchor on the vehicle; and
    (b) a harness connector attached by one end thereof to the anchor connector assembly and having a second end for attachment to a restraint harness carried by the child safety seat for restraining the seat occupant with respect to the vehicle through the tether strap assembly.

2. A tether strap assembly according to claim 1, further comprising an adjuster positioned on the strap intermediate the first and second seat connectors for adjusting the length of the strap.

3. A tether strap assembly according to claim 1, wherein the harness connector comprises a connection strap and a buckle attached to the connection strap.

4. A tether strap assembly according to claim 3, wherein the connection strap defines the one end of the harness connector and the buckle defines the second end of the harness connector.

5. A vehicle child safety seat adapted for connection to a vehicle, comprising:
    (a) a seat bottom and an attached seat back;
    (b) a restraint harness carried by the seat for restraining a seat occupant; and
    (c) a tether strap assembly carried by the seat back for connecting the seat to the vehicle, and comprising:
        (i) a strap having first and second seat connectors for attachment to opposing lateral sides of the seat back of the child safety seat and an anchor connector assembly positioned on the strap intermediate the first and second seat connectors and having an anchor connector thereon for attachment to a complementary anchor on the vehicle; and
        (ii) a harness connector attached by one end thereof to the anchor connector assembly and having a second end for attachment to the restraint harness carried by the child safety seat for restraining the seat occupant with respect to the vehicle through the tether strap assembly.

6. A vehicle child safety seat according to claim 5, wherein the restraint harness is adapted to be attached to a vehicle seat belt for restraining the seat occupant with respect to the vehicle through the vehicle seat bolt.

7. A vehicle child safety seat according to claim 5, wherein the restraint harness comprises shoulder straps having ends adapted to be attached to a vehicle seat belt for restraining the seat occupant with respect to the vehicle through the vehicle seat belt.

8. A vehicle child safety seat according to claim 5, further comprising an adjuster positioned on the strap intermediate the first and second seat connectors for adjusting the length of the strap.

9. A vehicle child safety seat according to claim 5, wherein the harness connector comprises a connection strap and a buckle attached to the connection strap.

10. A vehicle child safety seat according to claim 9, wherein the connection strap defines the one end of the harness connector and the buckle defines the second end of the harness connector.

* * * * *